United States Patent [19]

Clishem et al.

[11] Patent Number: 4,657,878

[45] Date of Patent: Apr. 14, 1987

[54] METHOD OF MAKING HIGH DENSITY, FUSION CAST BASIC METALLURGICAL REFRACTORY AND THE REFRACTORY ITSELF

[75] Inventors: Thomas A. Clishem; Leonard W. Pokallus, both of Louisville, Ky.

[73] Assignee: Corhart Refractories, Boston, Mass.

[21] Appl. No.: 699,911

[22] Filed: Feb. 8, 1985

[51] Int. Cl.$^4$ ............................................. C04B 35/04
[52] U.S. Cl. .................................... 501/115; 501/117; 501/119; 264/332; 373/62
[58] Field of Search ....................... 501/115, 119, 117; 264/332; 373/62

[56] References Cited

U.S. PATENT DOCUMENTS

| | | | |
|---|---|---|---|
| 1,615,750 | 1/1927 | Fulcher | 501/128 |
| 2,599,566 | 6/1951 | Magri | 106/59 |
| 2,690,974 | 4/1952 | Magri | 106/59 |
| 2,911,313 | 11/1956 | Sandmeyer | 106/59 |
| 3,079,452 | 2/1963 | Grollier-Baron | 373/62 |
| 3,116,156 | 12/1963 | Charvat | 106/59 |
| 3,132,954 | 5/1964 | Alper et al. | 501/117 |
| 3,198,643 | 8/1985 | Alper et al. | 106/59 |
| 3,328,183 | 6/1967 | Stoyell et al. | 501/115 |
| 3,332,740 | 7/1967 | Alper et al. | 264/332 |
| 3,337,354 | 8/1967 | Alper et al. | 501/115 |
| 3,763,302 | 10/1970 | Duchenoy et al. | 264/332 |
| 4,107,255 | 8/1978 | Clishem et al. | 501/117 |

Primary Examiner—Andrew H. Metz
Assistant Examiner—Steven Capella
Attorney, Agent, or Firm—Woodcock Washburn Kurtz Mackiewicz & Norris

[57] ABSTRACT

A novel method of making a refractory material is disclosed comprising the steps of providing an electrical arc metal furnace, charging that furnace with a charge of refractory oxide, and selecting voltage, amperage and electrode spacings to create novel "hum and scum" melt conditions. This hum and scum condition is maintained until said charge is substantially melted. The described technique is particularly useful for melting magnesia chrome materials to produce fusion cast refractory products which are highly reduced and quite dense. The elaboration of this product requires higher energy input per pound concurrent with an increased consumption of reducing materials compared with standard preparation conditions. The resulting product exhibits higher oxidation weight gains, higher densities, lower porosities, high cold crush strengths, more thermal shock resistance, and better corrosion-erosion resistance than similar magnesia chrome refractory products fused using prior "arc and bark" processes.

36 Claims, 3 Drawing Figures

METHOD OF MAKING HIGH DENSITY, FUSION CAST BASIC METALLURGICAL REFRACTORY AND THE REFRACTORY ITSELF

BACKGROUND OF THE INVENTION

The present invention relates to novel methods for producing fusion cast basic refractory materials, particularly those refractories produced from magnesia and chrome ore. In particular, this invention relates to such refractories which are generally used in the metallurgical industry to line or reline ferrous and non-ferrous processing vessels.

It has long been known to make various types of refractory articles. Natural refractory articles are made from natural clays or other materials. Artificial refractory articles may be made of material which is pressed or sintered, chemically bonded or formed by fusion in an electric or other furnace. Artificial refractory articles are often formed of materials such as fused alumina, magnesia, mullite (alumina silicate), magnesium aluminate, and silicon carbide.

Cast refractory articles are regularly formed by fusing the desired constituents in an electric furnace, pouring the fused molten material into a mold, and then cooling the casting in such a way as to prevent it from cracking. The refractory article may be cast into its preferred shape, or into a billet which is cut and/or ground into its desired shape. Alternatively, the refractory material, before or after initial use, can be crushed into grain which is pressed, with additions of other materials, such as binders, into shapes which are fired (sintered) to form rebonded fused grain refractory materials.

U.S. Pat. Nos. 1,615,750 (Fulcher); 2,690,974 (Magri, Jr.); and 2,599,566 (Magri, Jr.); 2,911,313 (Sandmeyer); 3,079,452 (Grollier-Baron et al.); 3,116,156 (Scharvat); 3,132,954 (Alper et al.); 3,198,643 (Alper et al.); 3,337,354 (Alper et al.); 3,763,302 (Duchenoy et al); and 4,107,255 (Clishem et al.), each disclose various refractory materials and the methods which may be used for making them.

As seen from the aforementioned patents, an advantageous refractory exhibits good resistance to corrosion and erosion under operating conditions, good resistance to spalling or cracking in response to thermal cycling; high levels of flexural rupture strength (as indicated by the modulus of rupture or MOR), minimal porosities and handling characteristics which permit casting, sawing, grinding, and rebonding by sintering (with or without other constituents) into suitable refractory materials.

Refractory materials composed of certain mineral oxides or mixtures of oxides, such as silica, alumina, zirconia, chrome oxide, magnesia, alkaline oxides, etc. are often used in the glass industry in order to produce linings for various apparatus. In the manufacture of glass refractories, molten refractory material, typically melted in electric arc furnaces operating at temperatures in the range of 1800° C., are melted, highly oxidized and/or oxygen lanced in their molten state. The result is a highly oxidized "white product". These white products are normally cast in their final shapes.

It is also known that various dense fused heat-cast refractories may be made from chrome ore and magnesia. Such products are disclosed in aforementioned U.S. Pat. Nos. 1,615,750, 2,690,974, and 2,599,566. As disclosed in U.S. Pat. No. 2,690,974, such refractories contain FeO, MgO, $Al_2O_3$ and $Cr_2O_3$, and are particularly characterized by their periclase and spinel phases. Such chrome-magnesia refractories are particularly suited for use in the manufacture of steel, which may consume several pounds of basic refractories for each ton of steel produced.

In the production of such fused cast metallurgical refractories, chrome ore, magnesite, and a variety of other materials are usually melted in electrical arc furnaces which comprise carbon/graphite electrodes. It is well known that the use of such electrodes in this process results in certain changes in the chemical composition of the melt. For example, U.S. Pat. No. 2,599,566 teaches that the use of graphite electrodes results in reduction of some of the FeO and the $Cr_2O_3$ as well as volatization of some of the MgO. According to this '566 patent, the percentages of $Cr_2O_3$ and FeO in the fused product are substantially those of the batch. On the other hand, increases in alumina occur at the expense of magnesia, and should be compensated for through the addition of extra amounts of calcined magnesite to the batch.

U.S. Pat. No. 3,079,452 discloses that the arcs between carbon electrodes have a marked reducing action when they are short, while when they are long the carbon given off by the electrodes is burnt in its course so that the reducing action becomes weaker, at least when the arc strikes in an oxidizing atmosphere, as, for example, free air. This patent points out that it could not be foreseen that the "particular faults of bubbling and cracking encountered with refractory products based on mineral oxides were due to a reducing action, particularly that of carbon, because in the glass industry, for example, the phenomenon of bubbling can have many causes". Accordingly, the '452 patent teaches the suppression or weakening of these defects by the use of a sufficiently long arc between the charge and an electrode or electrodes, so that the carbon given off by the electrodes might have time to burn before reaching the bath. To achieve this aim, the '452 patent discloses the desirability of minimizing the reducing action from the electrode by lengthening the arc created thereby, while at the same time agitating the molten product to improve its porosity. The '452 patent states:

"In this way applicants have observed that with a short arc, such as produced at the instant of striking of the arc following the moment when an electrode is moved away from the bath, the surface of the bath remains calm, while as one lengthens the arc by progressively increasing the distance of the electrode from the bath and if the intensity of the current is suitably adjusted there comes a moment when an intense agitation is visible at the surface of the bath. This agitation and the corresponding length of the arc often coincide, moreover, with the phenomenon of a 'whistling' arc".

The operation of electrical arc furnaces with "whistling arcs" is now the accepted standard in the glass refractory industry. In the production of metallurgical refractories similar electrode spacings are also the norm. When metallurgical refractory batches are processed under these conditions loud "arc and bark" melt conditions prevail. The "arc and bark" sound is a non-continuous, electrical discharge sound with random amplitude and random frequency occurences. The pitch and intensity of this sound vary over a wide range, from a sharp crackling noise to an abrupt and/or sustained roar.

It is also understood that the nature of the gaseous atmosphere in the fusion furnaces above the mass of molten matter plays an important part in the quality of products obtained, and that it is generally desirable to renew this atmosphere to ensure that it remains neutral or oxidizing. The circulation of air across the surface of the molten mass is now routinely accomplished using environmentally mandated dust collection equipment which draws air across a surface of the molten material which is in a state of constant agitation caused by whistling arcs.

It is further known that molten refractory materials may be "grogged" through additions of certain solid particulate materials which are principally added for a variety of purposes. One of these is to improve the spalling or cracking resistance of the resultant cast refractory. A variety of grog materials have been suggested for this purpose, including, for example, crushed solid particles of the cast material itself, or of various components of the batch from which it was made. In this regard, please refer to U.S. Pat. No. 4,107,255, which describes that grogging may improve the modulus of rupture at temperatures in the range of 1340°-1500° C. of a refractory cast from a molten mass having a composition consisting essentially (by weight) of 45-78% MgO, 0-30% $Cr_2O_3$, 0-35% $Al_2O_3$, 0-17% $FeO+Fe_2O_3$, at least 82% $MgO+Cr_2O_3+Al_2O_3+FeO$ plus $Fe_2O_3$, 1-8% $SiO_2$, 0-2% CaO+BaO plus $SrO_2$, 0-10% $TiO_2$ and 0-3% fluorine. In this patent, non-fused oxidic inorganic grog particles having losses on ignitions (L.O.I.) at 1000° C. of less than about 0.5% by weight and an aggregate $SiO_2$ content at least about equal to the $SiO_2$ content of the molten mass forming the cast refractory, are grogged into the molten material to effect the described improvement. A product made in accordance with the teachings of this patent is currently available under the tradename ENDUR.

Notwithstanding the improvements which have been made in the production of magnesia-chrome fusion cast refractories, such refractories remain subject to corrosion, erosion, cracking, spalling and other failures when used as linings of ferrous or non-ferrous production vessels. For this reason, the use of such refractories has been displaced to some extent by generally more expensive magnesia-carbon bonded refractories. Accordingly, a need exists for an improved, lower cost fusion cast refractory which exhibits improved corrosion-erosion resistance, and suitable thermal cycling, spalling and cracking resistance characteristics.

SUMMARY OF THE INVENTION

The present invention is based upon the discovery that improved fusion cast basic refractory products may be obtained by controlling the melt conditions in a three phase electrical arc melting furnace to create a "hum and scum" condition during melting. The "hum and scum" condition is characterized by short arc lengths (on the the order of ⅛ to ¼ inch), relatively low voltages and high amperages. The "hum and scum" melt condition is readily distinguished by the quiet humming resulting from short arcing, as opposed to the "barking" noise produced using prior longer arc techniques. It is also easily distinguished by only minor surface agitation which permits a scum to form on the surface of the melt.

Accordingly, the present invention provides a novel method for making fused refractory material, comprising the steps of providing an electrical arc melting furnace; charging that furnace with a charge of refractory oxides; selecting voltage, amperage and electrode spacings to create a hum and scum melt condition; and maintaining said hum and scum condition until said charge is substantially melted, whereby said melted charge may be cast to form the desired refractory material. This refractory has been found to exhibit lower porosity, higher bulk density, increased modulus of rupture at temperatures in the range of 1340° C., and improved corrosion resistance as compared to a refractory made from similar starting materials but using the prior art longer arc melting process. The method of the present invention has also been found to provide a product having a microstructure which shows a shift towards a less precipitated spinel, more primary periclase (with microcracked crystals) than similar products prepared using the prior art longer arc process. Although such a microstructure with microcracked crystals would normally be thought to be subject to excessive corrosion by steel slags, the high bulk densities of such refractories apparently retard slag penetration such that the corrosion characteristics of the refractory are better than would have been predicted. Instead, the microcracks appear to impart an improved resistance to spalling or cracking by relieving thermal stress.

In accordance with the preferred embodiment of the present invention, the refractory oxide charge principally comprises magnesia and chrome ore with minor amounts of other additives such as ilmenite, aluminum fluoride, and silica sand. This charge is preferably subjected to a hum and scum melt condition until it has received at least 0.90, preferably 0.95, kilowatts per pound of final molten casting. During this melting, the carbon/graphite electrodes of the preferred furnace are positioned to provide a short arc humming condition which results in a 60-100% increase in electrode consumption compared to the longer arc "barking operation". Under the preferred operating conditions, the electrode consumption rate is at least 1.0 (preferably 1.2) pounds per 100 pounds of final casting. Additionally, other methods of additions of carbonaceous materials or reducing components, such as reducing gases, may be used to enhance or augment the reduction of the batch. As is known to the art, such techniques may involve direct additions to the batch added via injection or lancing into the molten material in the furnace. The resultant molten refractory material is relatively reduced, exhibiting a ladle oxidation weight gain of at least 0.80% (preferably at least 0.90%) (at 1000° C.). The ladle apparent specific gravity is also at least 3.55, preferably at least 3.60, which compares favorably to specific gravities of comparable refractories produced from longer arc ("arc and bark") processes which are in the 3.30-3.40 range.

The present invention accordingly provides a novel fusion cast basic metallurgical refractory having an apparent specific gravity of at least 3.55 (as measured in the herein described ladle sample procedure), and consisting essentially of 45-75 wt % MgO, 0-30 wt % $Cr_2O_3$, 0-35 wt % $Al_2O_3$, 0-17 wt % FeO and/or $Fe_3O_4$, 1-8 wt % $SiO_2$, 0-2 wt % CaO, BaO and/or SrO, 0-10 wt % $TiO_2$, and 0-3 wt % fluorine. A ladle sample of this preferred refractory generally exhibits an apparent specific gravity of greater than 3.60, or about 3.70, and comprises at least 82 wt % of the MgO, $Cr_2O_3$, $Al_2O_3$, FeO and $Fe_2O_3$ components. While the novel products of the present invention exhibit better natural resistance to thermal shock, that resistance may be further improved by grogging the molten refractory material with up to 10 wt % grog. Non-fused, highly burned magnesia and tabular alumina have been found particularly suitable for this purpose when grogged in amounts of 5 to 10 percent by weight of the final casting.

Accordingly, a primary object of the present invention is the provision of an improved process for making fusion cast basic metallurgical refractory materials.

A further object of the present invention is the provision of a novel method for improving the apparent specific gravity, bulk density, and corrosion resistance of fused refractory materials.

A further object of the present invention is the provision of an improved fusion cast basic metallurgical refractory.

These and other objects of the present invention will become apparent from the following more detailed description.

DESCRIPTION OF THE PREFERRED EMBODIMENTS

The present invention provides a novel process for producing a fusion cast magnesia chrome product characterized by the use of relatively low voltages and high currents so as to produce an essentially stabilized short humming arc which results in the formation of an interrelated surface scum which minimizes melting oxidization effects while permitting significant degassing. The product of this method is characterized by a major reduction in porosity along with a higher level of reduction (oxidation-reduction state) as measured by the standard laboratory weight gain test. This state of reduction is also noted by an overall shift in the appearance/assemblage of the microstructure in a direction opposed to the generally accepted preferred oxidized structure for these types of bodies.

The novel process of the present invention is characterized by a combination of techniques which together result in a refractory product with the desired characteristics. The application of a very low melting voltage and high current so as to provide a short "arc humming" condition and its attendant interrelated "surface scum" is critical to achieving the desired product. This technique increases the reduction state of the resulting refractory by minimizing melting oxidizing effects.

Another important factor is the control of certain physical properties of the batch charge ingredients. In this regard it is desirable to minimize the moisture and other volatiles within the batch charge, as well as any "tramp" fluxes (contaminants) in the raw batch charge. It is also been found desirable to provide sufficient energy, on a kilowatts hours per pound basis, in the melt process of the phase to minimize the possibility that unmelted/semi-melted batch components may become entrained in the casting stream of the melt furnace when it is tapped or poured. The use of higher kilowatt hours per pound values may also impact the quality of the melt due in part to the increased residence time of the melt in the furnace. As seen from the short transition time in FIG. 2, the observed product change occurs quite rapidly, and is not explainable using conventional dilution equations.

Key measures in determining whether the process as performed has in fact resulted in the desired product is the apparent specific gravity and weight gain values determined on small ladle samples obtained from the molten stream during the casting-pouring operation. The process of the present invention yields apparent specific gravity results which are in range of 6-12% above the typical values achieved for comparable refractories which have been processed using the traditional longer-arc ("arc and bark") process. Oxidation weight gain values have similarly been found to be 20-50% greater than such normally processed refractories. For example, a typical value of ladle total weight gain (at 1000° C.) is about 0.700-0.750% for normally processed ladles, versus 0.900-1.100% for ladles produced in accordance with the preferred embodiment of the present invention.

In making fusion cast basic refractories, the melting process can be initiated from a "cold" furnace start-up by several well-known procedures, however the following description assumes a liquid-molten refractory pool or "heel" which is located in a three phase electrical arc melting furnace. The specific batches are charged in the melting furnace to begin a cycle of this process.

The process of the present invention is particularly useful in making refractories produced from base batches of magnesia and chrome ore. Currently available refractories of this general type are marketed under the tradenames "ENDUR" (Corhart), C104 (SEPR), and MAC-EC (Asahi). Each of these products are fusion cast basic refractories generally applied in the metallurgical industry to line or re-line ferrous and non-ferrous production vessels.

Figure 1:
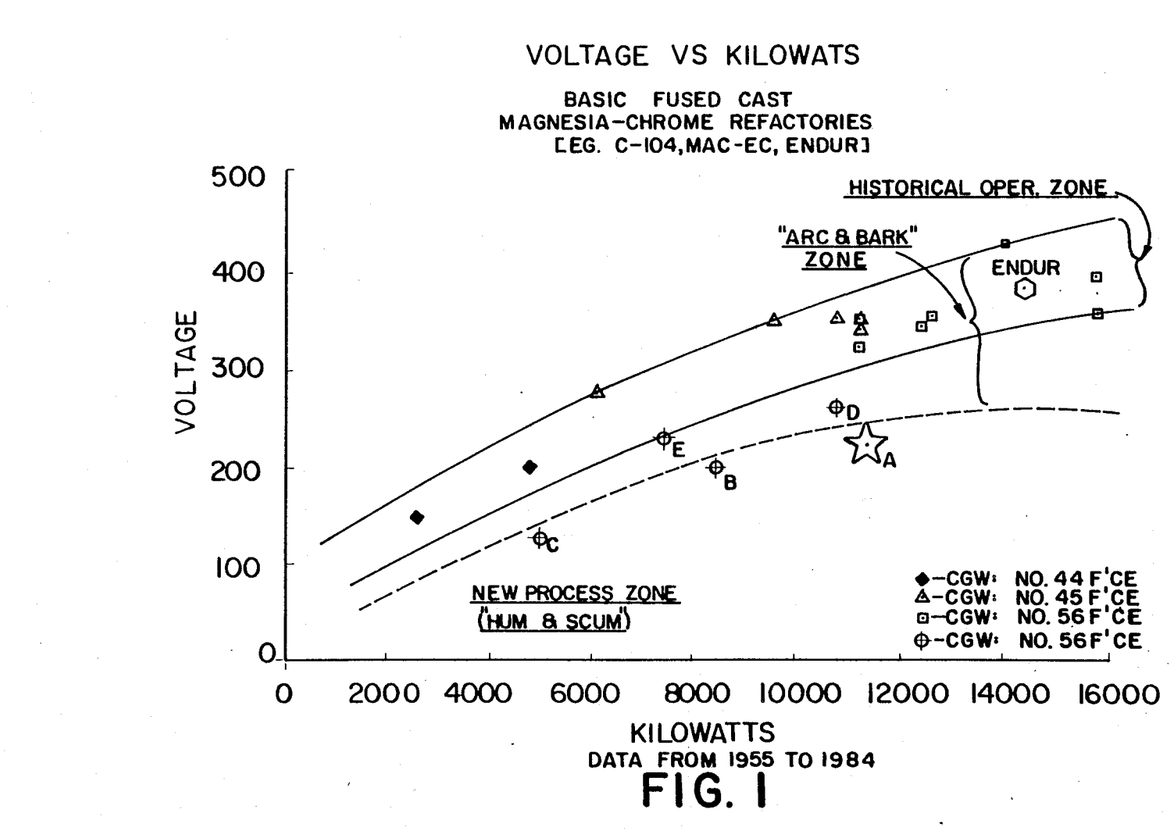
FIG. 1 is a graph of voltage versus kilowatts illustrating the known range of commercial operation of three phase electrical arc melting furnaces used in making basic fusion cast magnesia-chrome refractories (between the solid lines) and showing five additional points, two of which (points "D" and "E") are outside of the normal commercial operating zone but still within the "arc and bark" zone; and three of which (points "A", "B", and "C") are within the "hum and scum" operating zone of the present invention.

The novel parameters of the electrical melting mode which yield the desired operational conditions are illustrated in FIG. 1 hereof. FIG. 1 is a plot of the refractory melting furnace operating voltage versus power level in kilowatts during operation. It can be seen that when the operating mode (volts/KW) of all known practices or conditions are plotted from 1955 to present the parameters fall within a range or zone area on this plot which is enclosed between the two curved solid lines. The operational parameters between these curved lines create certain processing conditions. The oxide batch charge of the furnace is melted by the positioning of carbon/graphite electrodes above the surface of the charge and an electrical current is passed to the charge via arcing which then travels through the furnace charge/molten bath and back to the other electrodes as arcs. The physical length of the electrical arc is a function of several interacting conditions. These include the distance between the several electrodes, the volts-amps-kilowatts being employed, the interior furnace/arc zone atmosphere, etc. In the typical modern electrical arc furnace, the selected voltage and amperage conditions being employed are controlled by a servo mechanism which continuously repositions the electrodes at the required distance above the surface of the charge. It is known by those experienced in the fusion casting of this family of refractory products that the arc lengths produced using operating conditions within the solid lines of FIG. 1 are typically in the range of approximately 0.5-2.0 inches (such distance being the distance between of the electrode and the surface of the furnace charge/molten bath). It is also well-known that, when processing a basic metallurgical fusion cast refractory, under these arc length/conditions a loud arcing sound is generated which is referred herein as an "arc and bark" condition.

The present invention is predicated upon the discovery of a region outside of the historical operating zone mentioned above, where magnesia-chrome refractories can be melted, that produces an extremely short arc length, and a calm charge surface. Within this region the "arc and bark" characteristic of the melt operation is essentially absent. Operation within this zone (as indicated in FIG. 1 under the dashed line plot) may appropriately be called "hum and scum" operation. Rather than a loud barking or whistling sound of the electrical arc and the resultant agitation of the surface of the furnace charge, the operational sound is a low level hum, and the surface of the melted charge is calm to such a degree that a scum is formed. This scum may more readily form with higher melting point materials, such as magnesia-chrome.

Hum and scum conditions are conducive to a more reducing action of the furnace on the charge. Carbon from the electrodes not only effects this reducing action, but the surface scum also serves as a protective barrier to protect the melt from the oxidizing (free air) atmosphere in the furnace. In addition, the proximity of the carbon electrodes to the hot charge surface and the higher electrical current through the electrodes at the lower operating voltage (while maintaining high kilowatt levels) accelerates the amount of carbon from the electrode available for this reducing action.

Actual experimental tests on a production size melt furnace have shown that consumption of the carbon electrodes (pounds of electrodes used per unit weight of furnace charge) increases by a factor of approximately two times over the rate experienced when operating within the historical electrical operational mode. The arc length under the hum and scum conditions is approximately 75% to 90% shorter (about ⅛ inch to ¼ inch) even though the same diameter electrodes and the same distance/spacing between the electrodes are employed. Again referring to FIG. 1, it has also been found that to achieve the hum and scum condition, the operating mode must be substantially shifted out of the historical operating range. That is to say, hum and scum conditions may not be obtained as a result of a slight shift to a point near the edge of the historical operating zone.

Experiments have shown that points "D" and "E" represent shifts outside of or near the boundary of the historical region, at which the normal "arc and bark" circumstances persist. It has been found that a shift into a completely different zone must occur to achieve hum and scum conditions. This condition has been successfully achieved at parameters represented by the points "C", "B", and "A". Because of equipment limitations, point "A" has been selected to generate the test products which are the subject of the following examples. It is, of course, probable that a hum and scum condition could be established using operational parameters beyond the particular operational parameter limitations of the equipment used to generate the data in FIG. 1.

Prior experience with magnesia-chrome refractories would not have predicted that superior refractories would result from the use of a hum and scum melt process, either alone or in addition to other process parameters explained hereinafter. Such prior teachings would have suggested that a relatively more oxidized refractory product would be desirable, and that the preferred refractory products of the prior art should have a microstructure which is quite different from the microstructure produced using the preferred techniques of the present invention. In particular, the prevalence of microcracks in the refractory of the present invention would have been thought to accelerate corrosion, and lead to premature failure.

It is not completely understood why the process of the present invention yields a superior refractory product. It is theorized that the process yields a product with higher density and altered porosity which, as a total body, provides the product with more resistance to penetration by the damaging steel slags (e.g. improved corrosion resistance). Therefore, even though the product of the present invention exhibits microcracks which are generally believed to be generally undesirable faults, such microcracks are less negatively involved in corrosion failure and may serve as positive attributes is resisting thermal shock/spall tendencies by acting as structural stress relievers. It has also been noted that under the conditions of high bulk density (higher percentages of theoretical density) and more reduced states, the supposed negative aspects of silica are apparently voided. This allows less concern for somewhat higher silica levels which themselves contribute to improved bulk density and hot MOR properties.

It has further been recognized that during the melting process under hum and scum conditions, another important variable is the amount of energy in kilowatt hours per unit weight of furnace charge/refractory cast. When this kilowatt hour per pound factor is increased by 10% to 20%, the resultant product more consistently exhibits favorable characteristics. Historically this magnesia-chrome ore product consumes approximately 0.70-0.85 kilowatt hours per molten pound. The process of the present invention is preferably operated in excess of 0.90 kilowatt hours per molten pound, more preferably in excess of 0.95 kilowatt hours per molten pound. By operating at higher power levels per pound, the opportunity for unmelted or semi-melted batch charge components to be cast from the furnace when it is tapped or poured is minimized. Furthermore, the higher energy consumption of the batch may assist in expelling any undetected or unwanted impurities which may have been introduced with the batch materials, and which are volatilized at or near the fusion point. It is well known that dissolved gases in the cast molten material may cause defect holes and lower bulk density in the final refractory body as these gases come out of solution upon solidification. These dissolved gases may lower the liquidus temperature which can then alter the material solidification range. In addition, at any given power level input, higher kilowatt hours per molten pound will increase the residence time in the furnace of the molten charge prior to tapping or pouring, and will tend to allow some degassing within the furnace prior to casting. The scum effect tends to allow degassing of batch volatiles while maintaining a protective barrier to the atmosphere against bath gas pick-up. Also, this longer residence time may enhance the overall uniformity of the molten furnace charge, e.g. temperature, chemistry, etc.

Another important factor in achieving the desired products of the present invention is the nature of the batch itself. Batch characteristics should preferably be controlled to minimize the "tramp" fluxes in the raw batch charge. The level of moisture and L.O.I. volatiles should also be maintained at low levels. It has been found that the batch charge should be controlled with total moisture (110° C.) below 0.05%, and the total (1,000° C.) L.O.I. maintained below 0.09%. This compares for example with present normally processed magnesium-chrome fusion cast batch of approximately 0.05-1.00% moisture and about 0.30% L.O.I. Examples of tramp materials which should be maintained at minimum levels are boron, sulphur, lead, sodium, vanadium, and phosphorous. It is not presently understood why some such materials should be kept at minimum levels, other than those which contributes fluxing or gassing in the batch. Sodium and sulphur are of particular concern due to their association with gassing and low product density. Such materials should be maintained as low as practically and economically possible.

Figure 2:
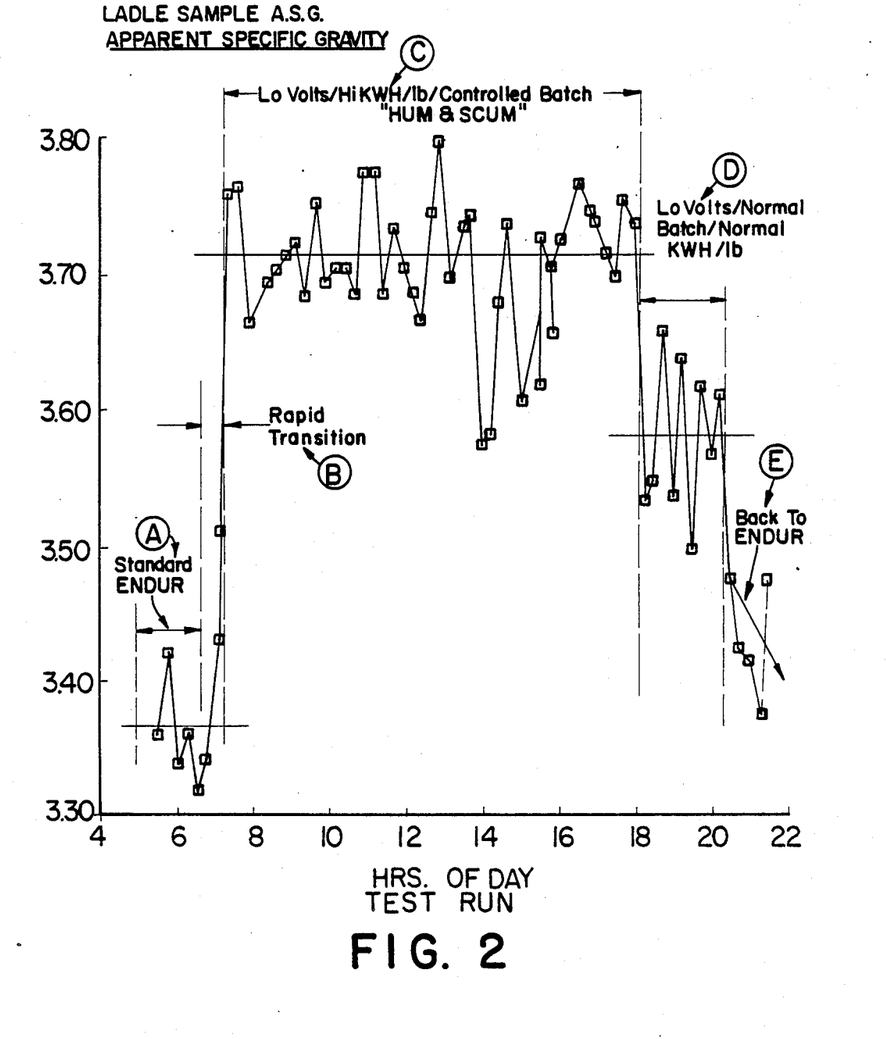
FIG. 2 is a graph of apparent specific gravities of ladle samples taken from taps or pours made over the course of a single test run; initially and finally (regions A and E) the electrical arc furnace was operated under standard arc and bark conditions; during the intermediate period hum and scum conditions were established causing the melt to undergo a rapid transition (region B), and then using a controlled batch, to achieve ladles exhibiting specific gravities generally in excess of 3.60 (region C); after which, using the same batch as in region A (region D) products generally in the 3.55-3.65 range were produced.

FIG. 2 is a graph of the ladle sample apparent specific gravity taken from a number of batches tapped during the course of a single day's test run. Region A is a plot of various samples of standard magnesia-chrome refractory batch used to cast Endur brand refractory material. The specific gravities of the plotted taps in this region will be seen to range from slightly above 3.30 to somewhat above 3.40. Region B illustrates the as of yet unexplained rapid transition in specific gravity which occurs when hum and scum conditions are created. When the melt process is operated in the hum and scum mode, higher kilowatt hours per molten pound are used for melting and the batch is controlled as outlined above, it has been found that the molten furnace charge shows a very rapid transition response. This change can occur in approximately 10 to 20 minutes, whereas normal compositional changes generally take one hour or more to effect when producing the normal fusion cast basic refractory. At present, the reason for this very rapid response is unknown. It nevertheless has important favorable implications for production melting and manufacturing economics.

The success of the aforementioned techniques can be judged by the procedure which was used in sampling the products of FIG. 2. This procedure involves taking a small sample (via a standardized sample cup or catcher) of the molten material from the furnace pour stream as the material is cast from the melter into a mold. This small rapidly solidified sample is broken open, and weighed in air and in water to determine its apparent specific gravity. Additionally, the visual appearance of the broken surface macrostructure, as well as the sample top configuration can be rated against a series of standards. Thus, in a relatively short period a decision can be made regarding the proper state of operational control.

EXAMPLE I

A typical batch for use in the herein disclosed process is composed of 55% magnesite, 42% chrome ore 1.5% ilmenite, 1% aluminum fluoride, and 0.5% silica sand. Based upon the analyses of these raw materials in the batch charge, the typical overall oxide compositional levels are as follows:

MgO: 56.0%
$Cr_2O_3$: 20.0%
FeO: 12.0%
$Al_2O_3$: 7.5%
$SiO_2$: 2.0%
$TiO_2$: 1.5%
$F_2$: 0.5%
CaO: 0.5%
Moisture at 110° C. less than 0.05%
L.O.I. (1,000°) less than 0.09%.

The above batch is charged into a furnace which has a residual liquid pool or "heel". The electrical mode of operation. is established at point "A" in the plot which is FIG. 1. This yields a "hum and scum" operation. The furnace dust collection system, which is connected to the furnace interior is operated at the minimum (SCFM) flow (consistent with dust collection requirements) to minimize the free air being drawn through the furnace. The furnace electrodes are operating with the short arc length previously described, and the center-to-center distance between the three 12" diameter electrodes is approximately 40 inches. Under these conditions, the rate of electrode consumption is approximately 1.2 lbs per 100 lbs. of final cast refractory (versus a normal rate of approximately 0.60 lbs. per 100 lbs.)

After melting, a casting is made. The melt duration is of sufficient time to allow approximately 0.95 kilowatt hours of energy to be used per lb. of molten weight of the final casting. While casting from the melting furnace into a mold, a ladle sample is obtained from the molten casting stream. The apparent specific gravity and visual rating of the sample are determined. The apparent specific gravity will be in excess of 3.60, and typically will be about the 3.70 level. This compares to typical Endur products which have ladle specific gravities in the 3.30-3.40 range (see FIG. 2). The type (connecting or isolated) and quantity of porosity, as well as the normal compositional variations will influence the final absolute value of apparent specific gravity. The sample will have a flat-to-concave shaped top surface and the interior macro-structure will generally exhibit a well defined drainage pipe or cavity surrounded by dense or solid refractory material. One experienced in the foundry art of molten castings and solidifications will readily recognize these "pipe" characteristics. Normal Endur or similar materials not processed according to this present invention usually display a flat-to-convex top surface with very different macrostructure showing essentially no evidence of drainage pipe and containing substantial quantities of varying size porosity dispersed throughout the volume.

The weight gain of the sample will be approximately 20-50% higher than Endur with typical values being approximately 0.90-1.10% for this product versus approximately 0.70-0.75 for normal Endur or C104. This weight gain evaluation is generally recognized as an index of the state of oxidation - reduction with the higher value indicating higher levels for reduction.

The mold, annealing and finishing operations consist of those presently recognized and employed by those familiar with the fusion cast process of this compositional area.

EXAMPLE II

The final refractory product prepared in accordance with Example I was subjected to various evaluations. Typical results are set forth in the following table.

TABLE I

| LABORATORY | C104 | ENDUR | EXAMPLE I PRODUCT |
|---|---|---|---|
| Bulk Density Avg (PCF) | 192 | 199 | 215 |
| % Porosity | ~20-25% | ~15% less than C104 | ~48% less than C104 |
| M.O.R. (RM. Temp) (P.S.I.) | ~1500 | ~1500 | ~1500 |
| Cold Crush Strength (PSI) | | | |
| Skin Sample | ~12000 | ~12000 | ~23000 |
| Interior Sample | ~15000 | ~15000 | ~16000 |
| Thermal Shock* (Cycles) | 2.0-2.5 | 2.5-3.0 | 3.0-4.0 |
| Hot M.O.R. (1340° C.) | | | |
| Skin Sample - PSI | ~2200 | ~2200 | ~3200 |
| Interior Sample - PSI | ~2500 | ~2500 | ~3100 |
| Corrosion Resistance (Elec Furn. Slag Medium) | 100 "BASE" | 17% More Resistance Than "Base" | 50% More Resistance Than "BASE" |
| App Porosity (%) | | | |
| Skin Sample | — | 10.6(9.1-11.6) | 5.2(3.8-7.6) |
| Interior Sample | — | 11.9(10.4-13.7) | 7.6(5.7-10.1) |
| Blk H$_2$O ABS (%) | — | 1.26(1.01-1.46) | 0.64(0.3-0.94) |

*One cycle represents heating a 1 × 1 × 4 inch prism from room temperature in a 1400° C. oven for fifteen minutes followed by air cooling at room temperature for fifteen minutes. Failure occurs when the prism cannot support its own weight (it falls apart).

The microstructure of the product prepared in accordance with the present invention shows a shift towards a less precipitated spinel, more primary periclase (with microcracked crystals) than normal Endur products.

Figure 3:
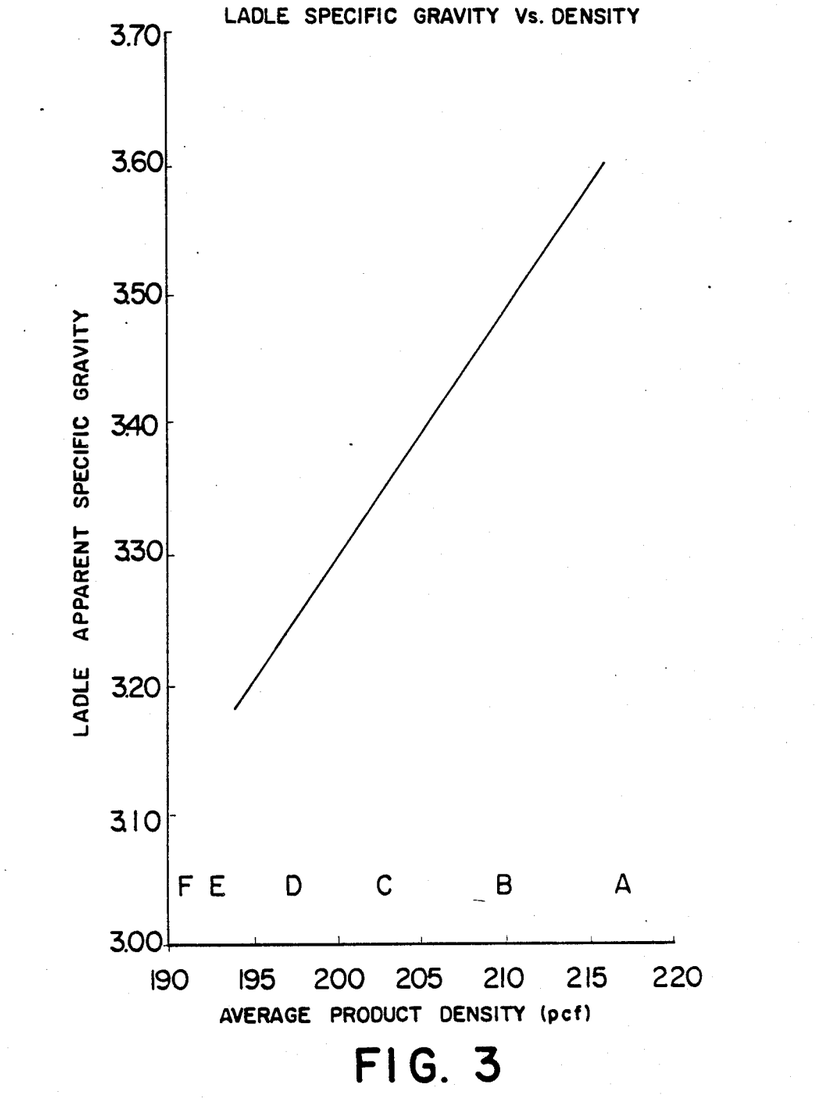
FIG. 3 is a graph illustrating the correspondence between ladle apparent specific gravity and average product bulk density, therefore relating the refractory product characteristics to the molten ladle sample.

Referring now to FIG. 3, the general relationship between the product (bulk density) and the values of a ladle sample apparent specific gravity is shown. It has also been found that some additional improvements can be made to the refractory product prepared in accordance with this invention by the application of special grogging, or inoculation of the molten stream. As mentioned above, U.S. Pat. No. 4,107,255 teaches that certain properties of fusion cast products can be improved by a grogging process which produces high temperature strength and reduces product "shell" defect. It has now further been discovered that additional benefits to a refractory article prepared in accordance with the present invention can be achieved by the addition of a non-fused highly burned, high bulk specific gravity magnesia particles to the melt as it is cast into the mold. The resultant product shows further improvements in its resistance to corrosion in steel making slag as well as improvements in its thermal shock-spall tendency. This magnesia should be added to the stream during casting in an amount equal to 5 to 10% by weight of the final casting. A typical magnesia suitable for employment as grog is periclase 98-1-1 which is currently available from Martin Marietta Chemicals, Refractory Division, Hunt Valley, Md. This magnesia when used as grog is not completely melted and is readily optically visible and identifiable in the final solidified refractory product. Examination of these visible grains shows some "shattering" cracked appearance and undoubtedly some limited partial melting has occurred at least on any smaller fragments and/or at the interface between the surface of the magnesia grain and molten refractory material.

It has also been further discovered that additional benefits to a refractory article prepared according to the present invention can be achieved by the addition of tabular alumina particles to the melt as it is cast into the mold. A typical tabular alumina suitable for employment as grog is tabular alumina, T-61, which is currently available from Aluminum Company of America. This tabular alumina should be added to the stream during casting in an amount equal to 5%-10% by weight of the final casting. The resultant product shows further improvements in thermal shock-spalling tendencies.

It is known that fused cast refractory products of the magnesia-chrome family can be impregnated to the micro-level with various materials (for example vacuum-pressure impregnated with carbonaceous pitch), and it is therefore anticipated that further improvement may be possible in in-use performance of a refractory prepared in accordance with the present invention which is subsequently so treated, particularly since the microstructure shows a shift to more microcracked crystals.

Cast refractories made in accordance with this invention may be used in the as-cast form as bricks or blocks for constructing linings of furnaces, or they may be cast as billets which are sawed into bricks or blocks for the same purpose. Alternately, they may be crushed into grain which is rebonded by sintering with or without other constituents into similar bricks or blocks. Further improvements in the rebonded sintered bricks may be possible by improving the sinter bond between these high density, more reduced grains by incrementally higher firing (sintering) temperature control.

Various field tests have been and are being conducted using the products of the present invention. Although definitive results have yet to be obtained from these field tests, initially the field performance of the aforementioned products of the present invention are superior to existing commercially available fused refractory products such as Endur.

From the foregoing description, one of ordinary skill in the art will recognize that the methods of the present invention are applicable not only to the production of superior products from normal batch materials, but also to the production of commercially acceptable products from substandard batch materials. Accordingly, by using the "hum and scum" electrical mode of operation, a relatively inexpensive source of raw material (i.e. one having high moisture contents and/or high L.O.I.) may be used to make a product which will compare favorably in terms of price and performance with those products, which are now commercially available.

What is claimed is:

1. A method for making a magnesia-chrome fused refractory material, comprising the steps of:
    (a) providing an electrical arc melting furnace;
    (b) charging that furnace with a charge comprising refractory oxide;

(c) selecting voltage, amperage and electrode spacings to create a hum and scum melt condition; and (d) maintaining said hum and scum condition until said charge is substantially melted, whereby a said melted charge may be cast to form refractory material.

2. The method of claim 1 wherein said charge comprises magnesia and chrome ore said hum and scum condition is maintained until said charge has received at least about 0.90 KWH per molten pound in the final casting.

3. The method of claim 2 wherein said condition is maintained until said charge has received at least about 0.95 KWH per molten pound in the final casting.

4. The method of claim 1 wherein said electrodes are carbon/graphite electrodes positioned to provide an electrode consumption rate of at least 1.0 lbs/100 lbs of final casting.

5. The method of claim 4 wherein said electrodes are positioned to provide an electrode consumption rate of at least 1.2 lbs/100 lbs of final casting.

6. The method of claim 1 wherein the majority of said charge by weight comprises magnesia and chrome oxides.

7. The method of claim 6 wherein said charge comprises magnesite and chrome ore.

8. The method of claim 7 wherein said charge comprises ilmenite.

9. The method of claim 7 wherein said charge comprises aluminum fluoride.

10. The method of claim 7 wherein said charge comprises silica sand.

11. The method of claim 6 wherein said charge comprises less than 0.05% total moisture (110° C.).

12. The method of claim 6 wherein said charge comprises less than 0.25% volatiles as determined by L.O.I. at 1000° C.

13. The method of claim 12 wherein said charge comprises less than 0.09% volatiles as determined by L.O.I. at 1000° C.

14. The method of claim 6 wherein steps (b), (c) and (d) are performed to provide a ladle apparent specific gravity of at least 3.60.

15. The method of claim 14 wherein said apparent specific gravity is at least 3.70.

16. The method of claim 6 wherein steps (b), (c), and (d) are performed to provide a ladle oxidation weight gain of at least 0.80% at 1000° C.

17. The method of claim 16 wherein said oxidation weight gain is at least 0.90% at 1000° C.

18. The method further comprising the steps of claim 1 providing at least a molten surface portion of said charge, and spacing said electrodes within less than one half inch from said molten surface portion.

19. The method of claim 18 wherein said electrodes are spaced between about one eighth and one quarter inch from said surface.

20. The method of claim 1 wherein said condition is maintained after said charge is melted to minimize the likelihood of casting semi-melted material.

21. The method of claim 1 wherein said charge is selected to provide a casting consisting essentially of 45–75 wt % MgO, 0–30 wt % $Cr_2O_3$, 0–35 wt % $Al_2O_3$, 0–17 wt % FeO and/or $Fe_2O_3$, 1–8 wt % $SiO_2$, 0–2 wt % CaO, BaO and/or SrO, 0–10 wt % $TiO_2$, and 0–3 wt % $F_2$.

22. The method of claim 21 wherein said MgO, $Cr_2O_3$, $Al_2O_3$, FeO and $Fe_2O_3$ components comprise at least 82 wt % of said casting.

23. The method of claim 1 wherein said charge is selected to provide a casting consisting essentially of 53–59 wt % MgO, 16–24 wt % $Cr_2O_3$, 9–13 wt % FeO and/or $Fe_2O_3$, 6–15 wt % $Al_2O_3$, 1–3 wt % $SiO_2$, 0.2–1.5 wt % CaO, 0–2 wt % $TiO_2$, and 0–1 wt % $F_2$.

24. The method of claim 1 wherein said melting is conducted in a non-oxidizing atmosphere.

25. The method of claim 24 wherein said melting is conducted in a reducing atmosphere.

26. The method of claim 1 further comprising the step of casting said melted material to form a solid refractory material.

27. The method of claim 1 wherein said casting step comprises the step of grogging said melted material with solid particles.

28. The method of claim 27 wherein melted material is grogged with magnesia.

29. The method of claim 28 wherein said magnesia is added in an amount up to about 10% by weight of the final casting.

30. The method of claim 29 wherein said magnesia is added in amounts of about 5 to 10% by weight of the final casting.

31. The method of claim 28 wherein said magnesia is non-fused, highly burned magnesia.

32. The method of claim 28 wherein said magnesia has a minimum bulk specific gravity of about 3.28.

33. The method of claim 27 wherein said melted material is grogged with alumina.

34. The method of claim 33 wherein said alumina is added in an amount up to about 10% by weight of the final casting.

35. The method of claim 34 wherein said alumina is added in amounts of about 5 to 10 percent by weight of the final casting.

36. The method of claim 33 wherein said alumina is tabular alumina.

* * * * *